United States Patent [19]
Axmann et al.

[11] 3,877,454
[45] Apr. 15, 1975

[54] AIR SEPARATOR

[75] Inventors: Franz Axmann, Fellbach; Jürgen Wahnschaffe, Cologne, both of Germany

[73] Assignee: Daimler-Benz Aktiengesellschaft, Stuttgart-Untertuerkheim, Germany

[22] Filed: Apr. 27, 1972

[21] Appl. No.: 247,975

[30] Foreign Application Priority Data
Apr. 27, 1971 Germany............................ 2120481

[52] U.S. Cl................ 123/198 E; 55/337; 55/348; 55/430
[51] Int. Cl............................................ B01d 50/00
[58] Field of Search ............................ 55/346–349, 55/321–324, 430, 337, 467, 470, 471, 472, 473, 269; 417/368; 123/122 D, 41.31, 198 E; 310/64, 56, 62, 63

[56] References Cited
UNITED STATES PATENTS
1,778,036  10/1930  Noble et al. ........................ 310/63
2,397,171  3/1946  Troller et al. ...................... 417/368
2,853,153  9/1958  Sexton ................................ 55/323
3,469,566  9/1969  Wilkinson ........................... 55/348
3,668,842  6/1972  Batson et al. ...................... 55/472
3,727,597  4/1973  Hensler .............................. 55/472

FOREIGN PATENTS OR APPLICATIONS
1,320,200  1/1963  France ................................ 55/337

Primary Examiner—Bernard Nozick
Attorney, Agent, or Firm—Craig & Antonelli

[57] ABSTRACT

An air filter, especially for larger engines with a filter constructed preferably as cyclone to which is connected a dust-suction-fan driven by an electric motor; the electric motor mounted on the filter housing is constructed as open motor readily accessible to cooling air and projects into a space filled with cleaned fresh air.

8 Claims, 1 Drawing Figure

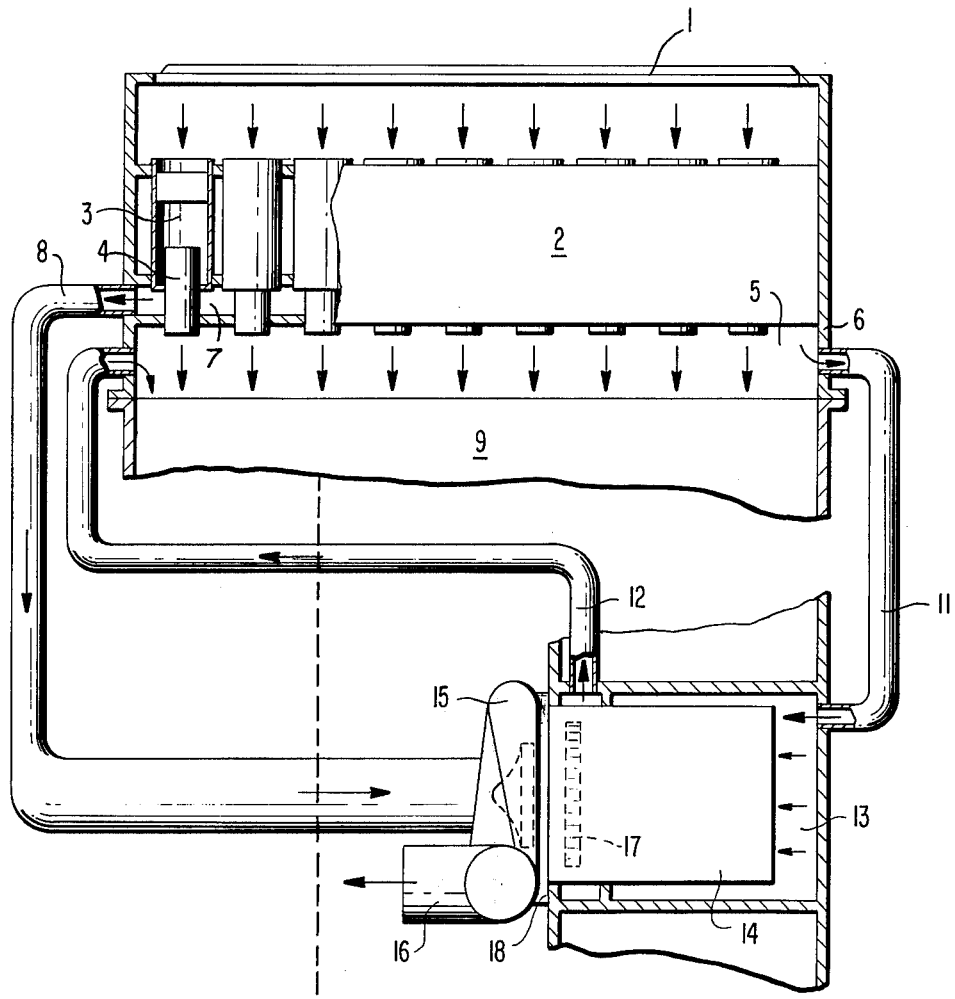

AIR SEPARATOR

The present invention relates to an air filter, especially for larger engines, with a preliminary separator or filter, preferably with a filter constructed as cyclone, to which is connected a dust-removal vacuum blower driven by an electric motor.

In engines, which are used, for example, for the drive of tanks, the sucked-in air has to be clean to a very high degree, i.e., has to be thoroughly filtered since the tanks operate also in dusty terrain, especially when the engines operate with an injection system.

The dust removed in large quantities by the separator or filter during the air-cleaning operation has to be sucked-off by an electrically driven blower in order to achieve a sufficiently long service life. The commercially available blowers together with the drive motors thereof are relatively bulky and heavy by reason of the necessary water-tightness and by reasons of the required cooling. These blowers and the motors connected therewith can therefore be hardly accommodated in the spatially constricted conditions existing, for example, in a tank.

Additionally, conditioned by the narrow installation conditions, the motors required for the drive of the blowers can be cooled only inadequately whereby a very high breakdown quota thereof must be reckoned with.

The aim of the present invention is to avoid these disadvantages, to improve the cooling of the electric motor and thereby to obtain the possibility to utilize a smaller motor which with smaller dimensions and with the same power output requires less space.

The underlying problems are solved according to the present invention in that the electric motor, preferably attached at the separator or filter housing, projects into the space filled with the cleaned fresh air as open motor readily accessible to the cooling air. The air filter including a preliminary filter constructed as cyclone and a fine filter can thereby be so constructed that the space filled with the cleaned fresh air is surrounded by a housing which connects the cyclone section with the fine filter and includes a branched connection for a circulating line which feeds the filtered air to a chamber surrounding the open electric motor which is built onto or into the preliminary separator or filter housing, and which again returns the filtered air into the housing from the side of the chamber opposite the air inlet.

With such an air filter, the dust air line branching off from the filter appropriately leads to the blower flangedly connected at the chamber which includes a dust discharge and a flange that carries the electric motor projecting into the chamber and essentially forms a chamber wall.

Appropriately, a fan may be arranged on the shaft projecting into the chamber for the reinforcement of the cooling effect of the electric motor which forcibly feeds the circulating air through the circulating line and through the chamber.

Accordingly, it is an object of the present invention to provide an air filter, particularly for larger internal combustion engines, which avoids by simple means the aforementioned shortcomings and drawbacks encountered in the prior art.

Another object of the present invention resides in an air filter, especially for larger injection type internal combustion engines which reduces the space requirements for the filter system.

A further object of the present invention resides in an air filter system which can be readily installed into a vehicle, for example, a tank, in which the available space is seriously limited.

Still another object of the present invention resides in a compact air filter system which nonetheless is characterized by a relatively long service life and high cleaning efficiency.

Another object of the present invention resides in an air filter system of the type described above which utilizes an electric motor for driving the suction blower and in which the cooling of the electric motor is considerably improved.

Still another object of the present invention resides in an air filter system which is simple in construction, utilizes relatively few parts and assures good efficiency for its intended purposes.

These and other objects, features and advantages of the present invention will become more apparent from the following description when taken in connection with the accompanying drawing which shows, for purposes of illustration only, one embodiment in accordance with the present invention, and wherein The single FIGURE is a schematic view of an air filter in accordance with the present invention, shown partially in cross section.

Referring now to the single FIGURE of the drawing, the sucked-in fresh air enters into the particle separator 2, such as a cyclone separator or a filter, by way of the suction opening 1. Several individual filters or separators 3 are arranged in the particle separator 2 adjacent one another in a row. Each individual filter or separator 3 includes an outlet or discharge 4 for filtered fresh air. These outlets or discharges 4 all terminate in a space 5 in which the filtered fresh air is collected and which is surrounded by a housing 6.

The removed dust falls from each individual separator or filter 3 into a collecting channel 7 to which is connected a dust-removal vacuum line 8.

A fine filter 9 of any conventional construction adjoins the housing 6, from which the air cleaned to the required extent is supplied to the engine in a conventional manner (not shown). A circulating line branches off from the housing 6 which consists of the branch line section 11 and of the return line section 12 and into which is connected the chamber 13. The discharge of the branch line 11 into this chamber 13 and the outlet of the return line 12 out of this chamber 13 are disposed mutually opposite so that clean, filtered air entering the chamber 13 is forced to flow through the entire chamber and thereby to cool the electric motor 14 projecting into the same. This electric motor 14 drives the blower 15 which sucks the separated or filtered out dust out of the collecting channel 7 by way of the dust removal suction line 8 and discharges the same by way of the dust discharge 16. A fan 17 is arranged on the shaft of the electric motor 14 projecting into the chamber 13, which supplies the circulating air that branches off as a part of the filtered fresh air out of the housing 6 and after the cooling of the electric motor 14 is fed back again into the space 5 by way of the return line 12. It becomes possible by means of the cooling with the cleaned fresh air to utilize a very small, open and lightweight electric motor which can be installed also in case of constricted space conditions as exist, for example, in a tank.

The blower 15 includes a flange 18 which carries the electric motor 14 projecting into the chamber 13 and essentially forms a chamber wall.

While we have shown and described only one embodiment in accordance with the present invention, it is understood that the same is not limited thereto but is susceptible of numerous changes and modifications as known to those skilled in the art and we, therefore, do not wish to be limited to the details shown and described herein but intend to cover all such changes and modifications as are encompassed by the scope of the appended claims.

What we claim is:

1. An air filter comprising
   filter housing means having a suction inlet air opening, particle separating means connected downstream of said inlet air opening for separating impurities from air introduced through said inlet air opening, impurity collecting means connected to said particle separating means for collecting impurities separated from the inlet air, and a space disposed downstream of said particle separating means for collecting fresh filtered air;
   vacuum blower means connected to said filter housing means for removing from said housing means impurities collected in said impurity collecting means; and
   motor means connected to said vacuum blower means for driving said vacuum blower means, said motor means projecting into said space such that said fresh filtered air provides cooling air to said motor means,
   wherein a chamber means is provided for enclosing said motor means, and said housing means includes a branch air line means for supplying said fresh filtered air from said housing means to said chamber means, said branch air line means having a return line connected between said chamber means and said housing means for returning said fresh filtered air to said housing means from said chamber means so that said fresh filtered air is circulated to said motor means and returned to said housing means, said motor means including a fan mounted on the shaft of said motor means for enhancing circulation of said fresh filtered air over said motor means within said chamber.

2. An air filter according to claim 1, wherein said particle separating means is a cyclone separator.

3. An air filter according to claim 1, further comprising a relatively large injection type internal combustion engine connected to the air filter, wherein said fresh filtered air is supplied as combustion air to said relatively large injection type internal combustion engine.

4. An air filter according to claim 1, wherein said particle separating means includes a cyclone separator between said inlet air opening and said space and a fine filter downstream of said space.

5. An air filter according to claim 1, wherein said motor means is an electric motor.

6. An air filter according to claim 1, wherein a suction line extends from said impurity collecting means to said vacuum blower means and said vacuum blower means includes an impurity discharge.

7. An air filter according to claim 6, wherein a flange separates said vacuum blower means and said motor means projecting into said chamber means, said flange essentially forming a chamber wall.

8. An air filter according to claim 7, wherein said motor means is an electric motor.

* * * * *